(12) United States Patent
Ganzel

(10) Patent No.: US 10,814,853 B2
(45) Date of Patent: Oct. 27, 2020

(54) VEHICLE BRAKE SYSTEM WITH FRONT AXLE OVERBOOST

(71) Applicant: Kelsey-Hayes Company, Livonia, MI (US)

(72) Inventor: Blaise Ganzel, Ann Arbor, MI (US)

(73) Assignee: ZF Active Safety US Inc., Livonia, MI (US)

( * ) Notice: Subject to any disclaimer, the term of this patent is extended or adjusted under 35 U.S.C. 154(b) by 0 days.

(21) Appl. No.: 16/256,474

(22) Filed: Jan. 24, 2019

(65) Prior Publication Data

US 2019/0225205 A1  Jul. 25, 2019

Related U.S. Application Data

(60) Provisional application No. 62/621,371, filed on Jan. 24, 2018.

(51) Int. Cl.

| | |
|---|---|
| *B60T 13/66* | (2006.01) |
| *B60T 13/68* | (2006.01) |
| *B60T 13/74* | (2006.01) |
| *B60T 8/40* | (2006.01) |
| *B60T 8/175* | (2006.01) |
| *B60T 7/04* | (2006.01) |
| *B60T 11/20* | (2006.01) |
| *B60R 21/013* | (2006.01) |
| *B60T 8/38* | (2006.01) |

(52) U.S. Cl.
CPC ............ *B60T 13/686* (2013.01); *B60T 7/042* (2013.01); *B60T 8/175* (2013.01); *B60T 8/4077* (2013.01); *B60T 8/4081* (2013.01); *B60T 11/20* (2013.01); *B60T 13/662* (2013.01); *B60T 13/745* (2013.01); *B60R 2021/01311* (2013.01); *B60T 8/38* (2013.01); *B60T 8/4018* (2013.01); *B60T 2220/04* (2013.01); *B60T 2270/402* (2013.01)

(58) Field of Classification Search
CPC ...... B60T 13/62; B60T 13/662; B60T 13/686; B60T 8/4081; B60T 8/4086; B60T 13/66; B60T 13/745
USPC ...................................................... 303/114.1
See application file for complete search history.

(56) References Cited

U.S. PATENT DOCUMENTS

| | | | |
|---|---|---|---|
| 4,826,257 A * | 5/1989 | Burckhardt | ........... B60T 8/1764 303/186 |
| 5,655,819 A | 8/1997 | Emig et al. | |
| 6,547,048 B2 * | 4/2003 | Haerr | .................... B60T 11/224 188/359 |

(Continued)

FOREIGN PATENT DOCUMENTS

| | | |
|---|---|---|
| DE | 102011080312 A1 | 2/2012 |
| DE | 102012205861 A1 | 10/2012 |

(Continued)

*Primary Examiner* — Christopher P Schwartz
(74) *Attorney, Agent, or Firm* — Gigette M. Bejin

(57) ABSTRACT

A brake system having a wheel brake and being operable under a non-failure normal braking mode and a manual push-through mode. The system includes a master cylinder operable by a brake pedal during the manual push-through mode to provide fluid flow at an output for actuating the wheel brake. A first source of pressurized fluid provides fluid pressure for actuating the wheel brake under the normal braking mode. A second source of pressurized fluid generates brake actuating pressure for actuating the wheel brake under the manual push-through mode.

14 Claims, 5 Drawing Sheets

(56) References Cited

U.S. PATENT DOCUMENTS

| | | |
|---|---|---|
| 9,776,607 B2 | 10/2017 | Brenn et al. |
| 10,391,994 B2* | 8/2019 | Drumm ................. B60T 8/4081 |
| 2016/0016571 A1* | 1/2016 | Ganzel ................. B60T 13/168 |
| | | 303/66 |
| 2016/0339885 A1 | 11/2016 | Linhoff et al. |
| 2017/0096130 A1* | 4/2017 | Drumm ................. B60T 8/3655 |
| 2017/0129469 A1 | 5/2017 | Besier et al. |
| 2017/0282877 A1* | 10/2017 | Besier ................. B60T 8/4086 |
| 2017/0361825 A1 | 12/2017 | Drumm et al. |
| 2019/0100189 A1* | 4/2019 | Ganzel ................. B60T 13/745 |
| 2019/0248348 A1* | 8/2019 | Ganzel ................. B60T 11/165 |
| 2019/0308596 A1* | 10/2019 | Besier ...................... B60T 8/94 |
| 2020/0062233 A1* | 2/2020 | Yu ........................ B60T 13/745 |

FOREIGN PATENT DOCUMENTS

| | | |
|---|---|---|
| DE | 102014220440 A1 | 7/2015 |
| DE | 102015212552 A1 | 1/2016 |
| DE | 102014225958 A1 | 6/2016 |
| DE | 102016203111 A1 | 9/2016 |
| DE | 102017000472 A1 | 7/2018 |
| JP | 2895770 B2 | 5/1999 |

* cited by examiner

VEHICLE BRAKE SYSTEM WITH FRONT AXLE OVERBOOST

CROSS-REFERENCE TO RELATED APPLICATIONS

This application claims the benefit of U.S. Provisional Application No. 62/621,371, filed Jan. 24, 2018, the disclosure of which is incorporated herein by reference.

BACKGROUND OF THE INVENTION

This invention relates in general to vehicle braking systems. Vehicles are commonly slowed and stopped with hydraulic brake systems. These systems vary in complexity but a base brake system typically includes a brake pedal, a tandem master cylinder, fluid conduits arranged in two similar but separate brake circuits, and wheel brakes in each circuit. The driver of the vehicle operates a brake pedal which is connected to the master cylinder. When the brake pedal is depressed, the master cylinder generates hydraulic forces in both brake circuits by pressurizing brake fluid. The pressurized fluid travels through the fluid conduit in both circuits to actuate brake cylinders at the wheels to slow the vehicle.

Base brake systems typically use a brake booster which provides a force to the master cylinder which assists the pedal force created by the driver. The booster can be vacuum or hydraulically operated. A typical hydraulic booster senses the movement of the brake pedal and generates pressurized fluid which is introduced into the master cylinder. The fluid from the booster assists the pedal force acting on the pistons of the master cylinder which generate pressurized fluid in the conduit in fluid communication with the wheel brakes. Thus, the pressures generated by the master cylinder are increased. Hydraulic boosters are commonly located adjacent the master cylinder piston and use a boost valve to control the pressurized fluid applied to the booster.

Braking a vehicle in a controlled manner under adverse conditions requires precise application of the brakes by the driver. Under these conditions, a driver can easily apply excessive braking pressure thus causing one or more wheels to lock, resulting in excessive slippage between the wheel and road surface. Such wheel lock-up conditions can lead to greater stopping distances and possible loss of directional control.

Advances in braking technology have led to the introduction of Anti-lock Braking Systems (ABS). An ABS system monitors wheel rotational behavior and selectively applies and relieves brake pressure in the corresponding wheel brakes in order to maintain the wheel speed within a selected slip range to achieve maximum braking force. While such systems are typically adapted to control the braking of each braked wheel of the vehicle, some systems have been developed for controlling the braking of only a portion of the plurality of braked wheels.

Electronically controlled ABS valves, comprising apply valves and dump valves, are located between the master cylinder and the wheel brakes. The ABS valves regulate the pressure between the master cylinder and the wheel brakes. Typically, when activated, these ABS valves operate in three pressure control modes: pressure apply, pressure dump and pressure hold. The apply valves allow pressurized brake fluid into respective ones of the wheel brakes to increase pressure during the apply mode, and the dump valves relieve brake fluid from their associated wheel brakes during the dump mode. Wheel brake pressure is held constant during the hold mode by closing both the apply valves and the dump valves.

To achieve maximum braking forces while maintaining vehicle stability, it is desirable to achieve optimum slip levels at the wheels of both the front and rear axles. During vehicle deceleration different braking forces are required at the front and rear axles to reach the desired slip levels. Therefore, the brake pressures should be proportioned between the front and rear brakes to achieve the highest braking forces at each axle. ABS systems with such ability, known as Dynamic Rear Proportioning (DRP) systems, use the ABS valves to separately control the braking pressures on the front and rear wheels to dynamically achieve optimum braking performance at the front and rear axles under the then current conditions.

A further development in braking technology has led to the introduction of Traction Control (TC) systems. Typically, valves have been added to existing ABS systems to provide a brake system which controls wheel speed during acceleration. Excessive wheel speed during vehicle acceleration leads to wheel slippage and a loss of traction. An electronic control system senses this condition and automatically applies braking pressure to the wheel cylinders of the slipping wheel to reduce the slippage and increase the traction available. In order to achieve optimal vehicle acceleration, pressurized brake fluid is made available to the wheel cylinders even if the master cylinder is not actuated by the driver.

During vehicle motion such as cornering, dynamic forces are generated which can reduce vehicle stability. A Vehicle Stability Control (VSC) brake system improves the stability of the vehicle by counteracting these forces through selective brake actuation. These forces and other vehicle parameters are detected by sensors which signal an electronic control unit. The electronic control unit automatically operates pressure control devices to regulate the amount of hydraulic pressure applied to specific individual wheel brakes. In order to achieve optimal vehicle stability, braking pressures greater than the master cylinder pressure must quickly be available at all times.

Brake systems may also be used for regenerative braking to recapture energy. An electromagnetic force of an electric motor/generator is used in regenerative braking for providing a portion of the braking torque to the vehicle to meet the braking needs of the vehicle. A control module in the brake system communicates with a powertrain control module to provide coordinated braking during regenerative braking as well as braking for wheel lock and skid conditions. For example, as the operator of the vehicle begins to brake during regenerative braking, electromagnet energy of the motor/generator will be used to apply braking torque (i.e., electromagnetic resistance for providing torque to the powertrain) to the vehicle. If it is determined that there is no longer a sufficient amount of storage means to store energy recovered from the regenerative braking or if the regenerative braking cannot meet the demands of the operator, hydraulic braking will be activated to complete all or part of the braking action demanded by the operator. Preferably, the hydraulic braking operates in a regenerative brake blending manner so that the blending is effectively and unnoticeably picked up where the electromagnetic braking left off. It is desired that the vehicle movement should have a smooth transitional change to the hydraulic braking such that the changeover goes unnoticed by the driver of the vehicle.

Brake systems may also include autonomous braking capabilities such as adaptive cruise control (ACC). During an autonomous braking event, various sensors and systems monitor the traffic conditions ahead of the vehicle and automatically activate the brake system to decelerate the vehicle as needed. Autonomous braking may be configured to respond rapidly in order to avoid an emergency situation. The brake system may be activated without the driver depressing the brake pedal or even if the driver fails to apply adequate pressure to the brake pedal. Advanced autonomous braking systems are configured to operate the vehicle without any driver input and rely solely on the various sensors and systems that monitor the traffic conditions surrounding the vehicle.

SUMMARY OF THE INVENTION

This invention relates to a brake system having a wheel brake and being operable under a non-failure normal braking mode and a manual push-through mode. The system includes a master cylinder operable by a brake pedal during the manual push-through mode to provide fluid flow at an output for actuating the wheel brake. A first source of pressurized fluid provides fluid pressure for actuating the wheel brake under the normal braking mode. A second source of pressurized fluid generates brake actuating pressure for actuating the wheel brake under the manual push-through mode.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
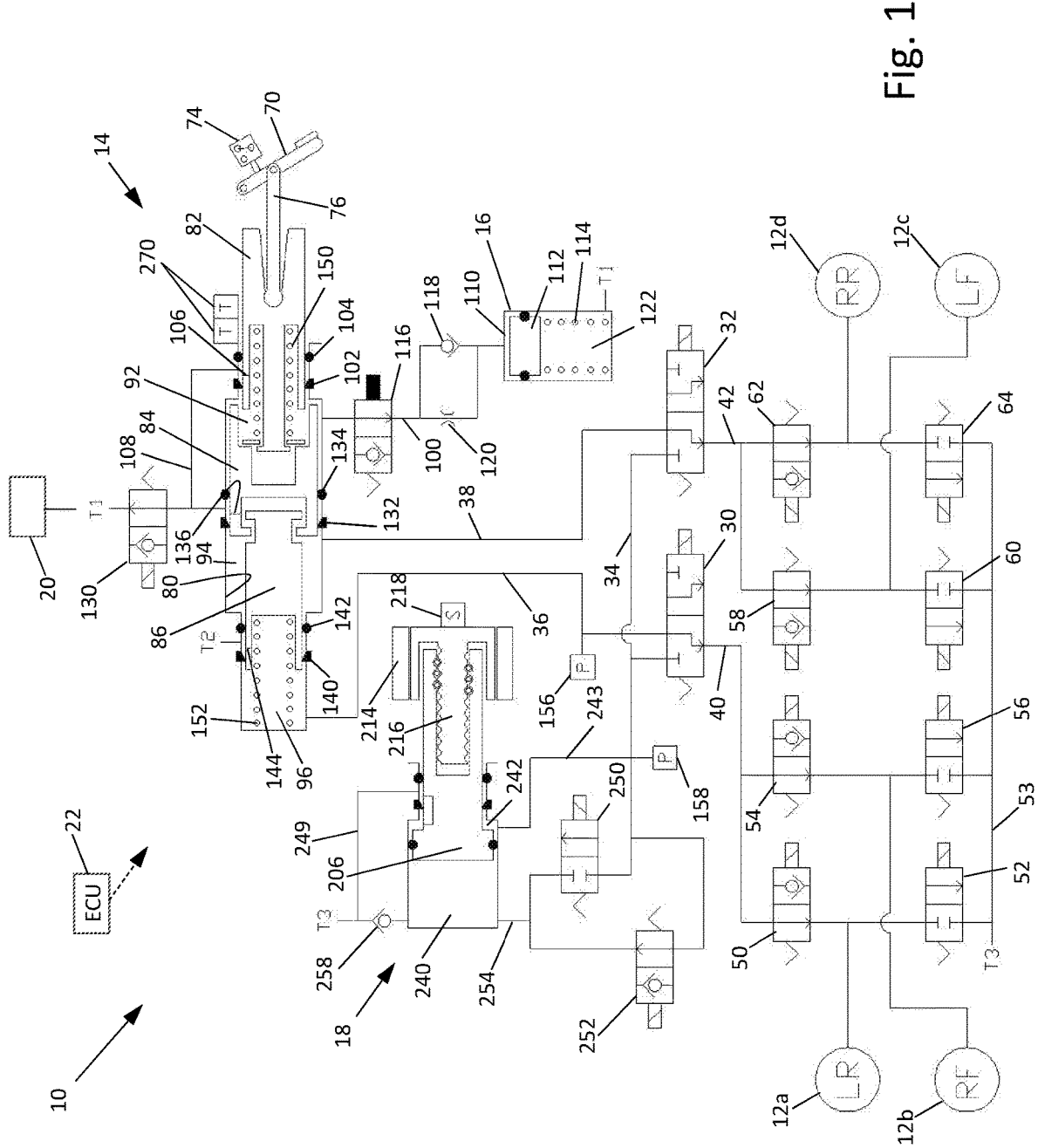
FIG. 1 is a schematic illustration of a first embodiment of a brake system.

Referring now to the drawings, there is schematically illustrated in FIG. 1 a first embodiment of a vehicle brake system, indicated generally at 10. The brake system 10 is a hydraulic braking system in which fluid pressure from a source is operated to apply braking forces for the brake system 10. The brake system 10 may suitably be used on a ground vehicle such as an automotive vehicle having four wheels. Furthermore, the brake system 10 can be provided with other braking functions such as anti-lock braking (ABS) and other slip control features to effectively brake the vehicle, as will be discussed below. In the illustrated embodiment of the brake system 10, there are four wheel brakes 12*a*, 12*b*, 12*c*, and 12*d*. The wheel brakes 12*a*, 12*b*, 12*c*, and 12*d* can have any suitable wheel brake structure operated by the application of pressurized brake fluid. The wheel brakes 12*a*, 12*b*, 12*c*, and 12*d* may include, for example, a brake caliper mounted on the vehicle to engage a frictional element (such as a brake disc) that rotates with a vehicle wheel to effect braking of the associated vehicle wheel. The wheel brakes 12*a*, 12*b*, 12*c*, and 12*d* can be associated with any combination of front and rear wheels of the vehicle in which the brake system 10 is installed. A diagonally split brake system is illustrated such that the wheel brake 12*a* is associated with the left rear wheel, the wheel brake 12*b* is associated with the right front wheel, the wheel brake 12*c* is associated with the left front wheel, and the wheel brake 12*d* is associated with the right rear wheel. Alternatively for a vertically split system, the wheel brakes 12*a* and 12*b* may be associated with the front wheels, and the wheel brakes 12*c* and 12*d* may be associated with the rear wheels.

The brake system 10 includes a master cylinder, indicated generally at 14, a pedal simulator 16, a plunger assembly, indicated generally at 18, and a reservoir 20. The reservoir 20 stores and holds hydraulic fluid for the brake system 10. The fluid within the reservoir 20 is preferably held at or about atmospheric pressure but may store the fluid at other pressures if so desired. The brake system 10 may include a fluid level sensor (not shown) for detecting the fluid level of the reservoir 20. Note that in the schematic illustration of FIG. 1, conduit lines may not be specifically drawn leading to the reservoir 20 but may be represented by conduits ending and labelled with T1, T2, or T3 indicating that these various conduits are connected to one or more tanks or sections of the reservoir 20. Alternatively, the reservoir 20 may include multiple separate housings. As will be discussed in detail below, the plunger assembly 18 of the brake system 10 functions as a source of pressure to provide a desired pressure level to the wheel brakes 12*a*, 12*b*, 12*c*, and 12*d* during a typical or normal brake apply. Fluid from the wheel brakes 12*a*, 12*b*, 12*c*, and 12*d* may be returned to the plunger assembly 18 and/or diverted to the reservoir 20.

The brake system 10 includes an electronic control unit (ECU) 22. The ECU 22 may include microprocessors. The ECU 22 receives various signals, processes signals, and controls the operation of various electrical components of the brake system 10 in response to the received signals. The ECU 22 can be connected to various sensors such as pressure sensors, travel sensors, switches, wheel speed sensors, and steering angle sensors. The ECU 22 may also be connected to an external module (not shown) for receiving information related to yaw rate, lateral acceleration, longitudinal acceleration of the vehicle such as for controlling the brake system 10 during vehicle stability operation. Additionally, the ECU 22 may be connected to the instrument cluster for collecting and supplying information related to warning indicators such as an ABS warning light, a brake fluid level warning light, and a traction control/vehicle stability control indicator light.

The brake system 10 further includes first and second isolation valves 30 and 32. The isolation valves 30 and 32 may be solenoid actuated three way valves. The isolation valves 30 and 32 are generally operable to two positions, as schematically shown in FIG. 1. The first and second isolation valves 30 and 32 each have a port in selective fluid communication with an output conduit 34 generally in communication with an output of the plunger assembly 18, as will be discussed below. The first and second isolation valves 30 and 32 also includes ports that are selectively in fluid communication with conduits 36 and 38, respectively, when the first and second isolation valves 30 and 32 are non-energized, as shown in FIG. 1. The first and second isolation valves 30 and 32 further include ports that are in fluid communication with conduits 40 and 42, respectively, which provide fluid to and from the wheel brakes 12*a*, 12*b*, 12*c*, and 12*d*.

In a preferred embodiment, the first and/or second isolation valves 30 and 32 may be mechanically designed such that flow is permitted to flow in the reverse direction (from conduit 34 to the conduits 36 and 38, respectively) when in their de-energized positions and can bypass the normally closed seat of the valves 30 and 32. Thus, although the 3-way valves 30 and 32 are not shown schematically to indicate this fluid flow position, it is noted that that the valve design may permit such fluid flow. This may be helpful in performing self-diagnostic tests of the brake system 10.

The system 10 further includes various solenoid actuated valves (slip control valve arrangement) for permitting controlled braking operations, such as ABS, traction control, vehicle stability control, and regenerative braking blending. A first set of valves includes a first apply valve 50 and a first dump valve 52 in fluid communication with the conduit 40 for cooperatively supplying fluid received from the first isolation valve 30 to the wheel brake 12a, and for cooperatively relieving pressurized fluid from the wheel brake 12a to a reservoir conduit 53 in fluid communication with the reservoir 20. A second set of valves includes a second apply valve 54 and a second dump valve 56 in fluid communication with the conduit 40 for cooperatively supplying fluid received from the first isolation valve 30 to the wheel brake 12b, and for cooperatively relieving pressurized fluid from the wheel brake 12b to the reservoir conduit 53. A third set of valves includes a third apply valve 58 and a third dump valve 60 in fluid communication with the conduit 42 for cooperatively supplying fluid received from the second isolation valve 32 to the wheel brake 12c, and for cooperatively relieving pressurized fluid from the wheel brake 12c to the reservoir conduit 53. A fourth set of valves includes a fourth apply valve 62 and a fourth dump valve 64 in fluid communication with the conduit 42 for cooperatively supplying fluid received from the second isolation valve 32 to the wheel brake 12d, and for cooperatively relieving pressurized fluid from the wheel brake 12d to the reservoir conduit 53. Note that in a normal braking event, fluid flows through the non-energized open apply valves 50, 54, 58, and 62. Additionally, the dump valves 52, 56, 60, and 64 are preferably in their non-energized closed positions to prevent the flow of fluid to the reservoir 20.

The master cylinder 14 is connected to a brake pedal 70 and is actuated by the driver of the vehicle as the driver presses on the brake pedal 70. A brake sensor or switch 72 may be connected to the ECU 22 to provide a signal indicating a depression of the brake pedal 70. As will be discussed below, the master cylinder 14 may be used as a back-up source of pressurized fluid to essentially replace the normally supplied source of pressurized fluid from the plunger assembly 18 under certain failed conditions of the brake system 10. The master cylinder 14 can supply pressurized fluid in the conduits 36 and 38 (that are normally closed off at the first and second isolation valves 30 and 32 during a normal brake apply) to the wheel brake 12a, 12b, 12c, and 12d as required.

The master cylinder 14 includes a housing having a multi-stepped bore 80 formed therein for slidably receiving various cylindrical pistons and other components therein. The housing may be formed as a single unit or include two or more separately formed portions coupled together. An input piston 82, a primary piston 84, and a secondary piston 86 are slidably disposed within the bore 80. The input piston 82 is connected with the brake pedal 70 via a linkage arm 76. Leftward movement of the input piston 82, the primary piston 84, and the secondary piston 86 may cause, under certain conditions, a pressure increase within an input chamber 92, a primary chamber 94, and a secondary chamber 96, respectively. Various seals of the master cylinder 14 as well as the structure of the housing and the pistons 82, 84, and 86 define the chambers 92, 94, and 96. For example, the input chamber 92 is generally defined between the input piston 82 and the primary piston 84. The primary chamber 94 is generally defined between the primary piston 84 and the secondary piston 86. The secondary chamber 96 is generally defined between the secondary piston 86 and an end wall of the housing formed by the bore 80.

The input chamber 92 is in fluid communication with the pedal simulator 16 via a conduit 100, the reason for which will be explained below. The input piston 82 is slidably disposed in the bore 80 of the housing of the master cylinder 14. An outer wall of the input piston 82 is engaged with a lip seal 102 and a seal 104 mounted in grooves formed in the housing. A passageway 106 (or multiple passageways) is formed through a wall of the piston 82. As shown in FIG. 1, when the master cylinder 14 is in its rest position (the driver is not depressing the brake pedal 70), the passageway 106 is located between the lip seal 102 and the seal 104. In the rest position, the passageway 106 permits fluid communication between the input chamber 92 and the reservoir 20 via a conduit 108. Sufficient leftward movement of the input piston 82, as viewing FIG. 1, will cause the passageway 106 to move past the lip seal 102, thereby preventing the flow of fluid from the input chamber 92 into the conduit 108 and the reservoir 20. Further leftward movement of the input piston 82 will pressurize the input chamber 92 causing fluid to flow into the pedal simulator 16 via the conduit 100. As fluid is diverted into the pedal simulator 16, a simulation chamber 110 within the pedal simulator 16 will expand causing movement of a piston 112 within the pedal simulator 16. Movement of the piston 112 compresses a spring assembly, schematically represented as a spring 114. The compression of the spring 114 provides a feedback force to the driver of the vehicle which simulates the forces a driver feels at the brake pedal 70 in a conventional vacuum assist hydraulic brake system, for example. The spring 114 of the pedal simulator 16 can include any number and types of spring members as desired. For example, the spring 114 may include a combination of low rate and high rate spring elements to provide a non-linear force feedback.

The simulation chamber 110 of the pedal simulator 16 is in fluid communication with the conduit 100 which is in fluid communication with the input chamber 92. A normally closed solenoid actuated simulator valve 116 is positioned within the conduit 100 to selectively prevent the flow of fluid from the input chamber 92 to the simulation chamber 110, such as during a failed condition in which the master cylinder 14 is utilized to provide a source of pressurized fluid to the wheel brakes. In its energized open position, the simulator valve 116 permits fluid communication between the input chamber 92 of the master cylinder 14 and the simulation chamber 110 of the pedal simulator 16. The brake system 10 may further include a check valve 118 which is in a parallel path arrangement with a restricted orifice 120 in the conduit 100. The check valve 118 and the restricted orifice 120 could be integrally built or formed in the simulator valve 116 or may be formed separately therefrom. The restricted orifice 120 provides damping during a spike apply in which the driver depresses the brake pedal 70 rapidly and forcefully. This damping provides a force feedback making depression of the brake pedal 70 feel more like a traditional vacuum booster, which may be a desirable characteristic of the brake system 10. The damping may also provide a more accurate relationship between brake pedal travel and vehicle deceleration by generally avoiding too much brake pedal travel for the vehicle deceleration that can be delivered by the brake system 10. The check valve 118 provides an easy flow path and allows the brake pedal 70 to return quickly, which allows the associated brake pressure to decrease quickly per the driver's intent.

As discussed above, the input chamber 92 of the master cylinder 14 is selectively in fluid communication with the reservoir 20 via a conduit 108 and the passageway 106 formed in the input piston 82. The brake system 10 may include an optional simulator test valve 130 located within the conduit 108. The simulator test valve 130 may be electronically controlled between an open position, as shown in FIG. 1, and a powered closed position. The simulator test valve 130 is not necessarily needed during a normal boosted brake apply or for a manual push through mode. The simulator test valve 130 can be energized to a closed position during various testing modes to determine the correct operation of other components of the brake system 10. For example, the simulator test valve 130 may be energized to a closed position to prevent venting to the reservoir 20 via the conduit 108 such that a pressure build up in the master cylinder 14 can be used to monitor fluid flow to determine whether leaks may be occurring through seals of various components of the brake system 10.

The primary chamber 94 of the master cylinder 14 is in fluid communication with the second isolation valve 32 via the conduit 38. The primary piston 84 is slidably disposed in the bore 80 of the housing of the master cylinder 14. An outer wall of the primary piston 84 is engaged with a lip seal 132 and a seal 134 mounted in grooves formed in the housing. One or more passageways 136 are formed through a wall of the primary piston 84. The passageway 136 is located between the lip seal 132 and the seal 134 when the primary piston 84 is in its rest position, as shown in FIG. 1. Note that in the rest position the lip seal 132 is just slightly to the left of the passageway 136, thereby permitting fluid communication between the primary chamber 94 and the reservoir 20.

The secondary chamber 96 of the master cylinder 14 is in fluid communication with the first isolation valve 30 via the conduit 36. The secondary piston 86 is slidably disposed in the bore 80 of the housing of the master cylinder 14. An outer wall of the secondary piston 86 is engaged with a lip seal 140 and a seal 142 mounted in grooves formed in the housing. One or more passageways 144 are formed through a wall of the secondary piston 86. As shown in FIG. 1, the passageway 144 is located between the lip seal 140 and the seal 142 when the secondary piston 86 is in its rest position. Note that in the rest position the lip seal 140 is just slightly to the left of the passageway 144, thereby permitting fluid communication between the secondary chamber 96 and the reservoir 20 (T2).

If desired, the primary and secondary pistons 84 and 86 may be mechanically connected with limited movement therebetween. The mechanical connection of the primary and secondary pistons 84 and 86 prevents a large gap or distance between the primary and secondary pistons 84 and 86 and prevents having to advance the primary and secondary pistons 84 and 86 over a relatively large distance without any increase in pressure in the non-failed circuit. For example, if the brake system 10 is under a manual push through mode and fluid pressure is lost in the output circuit relative to the secondary piston 86, such as for example in the conduit 36, the secondary piston 86 will be forced or biased in the leftward direction due to the pressure within the primary chamber 94. If the primary and secondary pistons 84 and 86 were not connected together, the secondary piston 86 would freely travel to its further most left-hand position, as viewing FIG. 1, and the driver would have to depress the pedal 70 a distance to compensate for this loss in travel. However, because the primary and secondary pistons 84 and 86 are connected together, the secondary piston 86 is prevented from this movement and relatively little loss of travel occurs in this type of failure. Any suitable mechanical connection between the primary and secondary pistons 84 and 86 may be used. For example, as schematically shown in FIG. 1, the right-hand end of the secondary piston 86 may include an outwardly extending flange that extends into a groove formed in an inner wall of the primary piston 84. The groove has a width which is greater than the width of the flange, thereby providing a relatively small amount of travel between the first and secondary pistons 84 and 86 relative to one another.

The master cylinder 14 may include an input spring 150 generally disposed between the input piston 82 and the primary piston 84. Additionally, the master cylinder 14 may include a primary spring (not shown) disposed between the primary piston 84 and the secondary piston 86. A secondary spring 152 may be included and disposed between the secondary piston 86 and a bottom wall of the bore 80. The input, primary and secondary springs may have any suitable configuration, such as a caged spring assembly, for biasing the pistons in a direction away from each other and also to properly position the pistons within the housing of the master cylinder 14.

The brake system 10 may further include a pressure sensor 156 in fluid communication with the conduit 36 to detect the pressure within the secondary pressure chamber 96 and for transmitting the signal indicative of the pressure to the ECU 22. Additionally, the brake system 10 may further include a pressure sensor 158 in fluid communication with the conduit 34 for transmitting a signal indicative of the pressure at the output of the plunger assembly 18.

Figure 2:
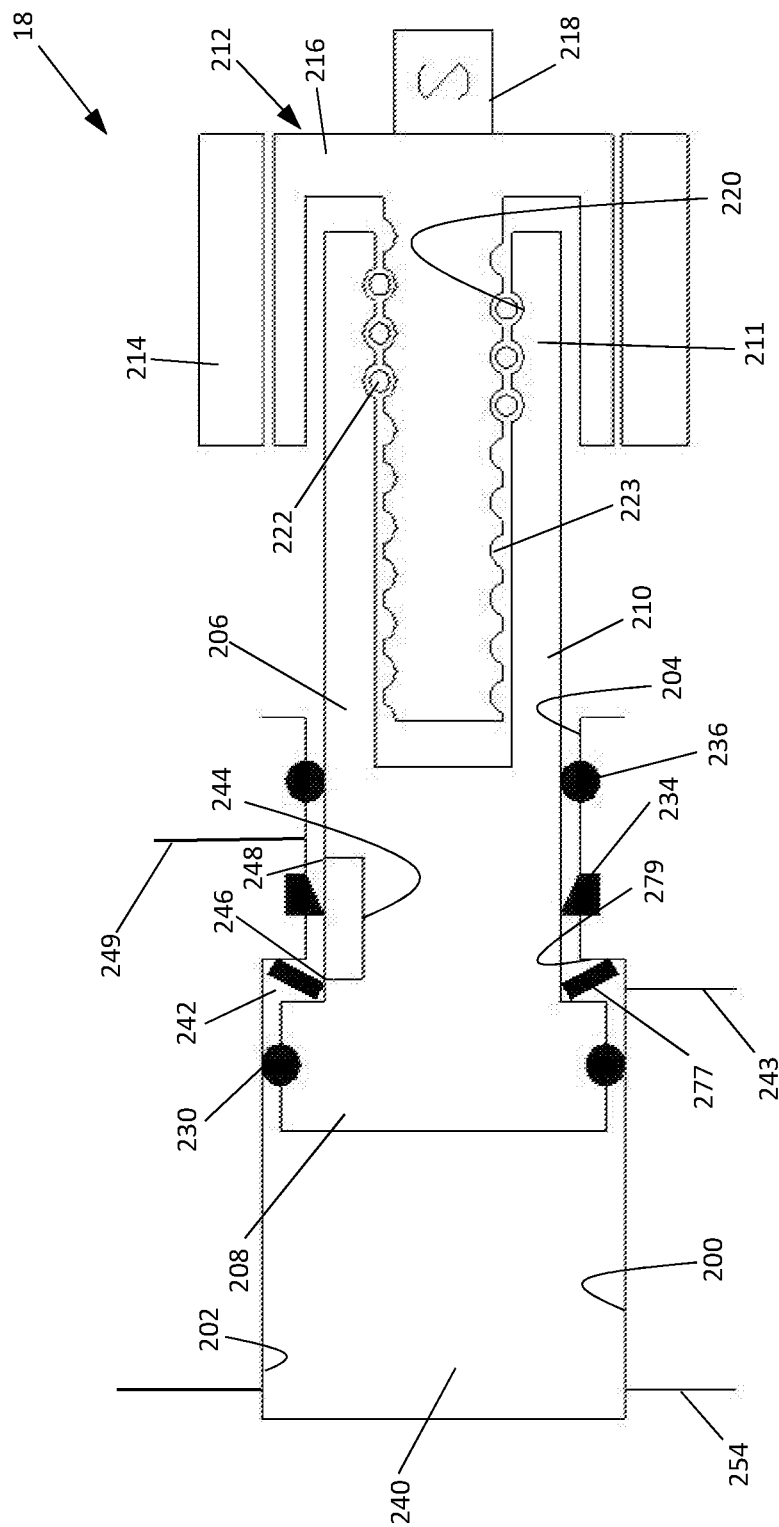
FIG. 2 is an enlarged schematic illustration of the plunger assembly of the brake system of FIG. 1.

As shown schematically in FIG. 2, the plunger assembly 18 includes a housing having a multi-stepped bore 200 formed therein. The bore 200 includes a first portion 202 and a second portion 204. A piston 206 is slidably disposed within the bore 200. The piston 206 includes an enlarged end portion 208 connected to a smaller diameter central portion 210. The piston 206 has a second end 211 connected to a ball screw mechanism, indicated generally at 212. The ball screw mechanism 212 is provided to impart translational or linear motion of the piston 206 along an axis defined by the bore 200 in both a forward direction (leftward as viewing FIGS. 1 and 2), and a rearward direction (rightward as viewing FIGS. 1 and 2) within the bore 200 of the housing. In the embodiment shown, the ball screw mechanism 212 includes a motor 214 rotatably driving a screw shaft 216. The second end 211 of the piston 206 includes a threaded bore 220 and functions as a driven nut of the ball screw mechanism 212. The ball screw mechanism 212 includes a plurality of balls 222 that are retained within helical raceways 223 formed in the screw shaft 216 and the threaded bore 220 of the piston 206 to reduce friction. Although a ball screw mechanism 212 is shown and described with respect to the plunger assembly 18, it should be understood that other suitable mechanical linear actuators may be used for imparting movement of the piston 206. It should also be understood that although the piston 206 functions as the nut of the ball screw mechanism 212, the piston 206 could be configured to function as a screw shaft of the ball screw mechanism 212. Of course, under this circumstance, the screw shaft 216 would be configured to function as a nut having internal helical raceways formed therein. The piston 206 may include structures (not shown) engaged with cooperating structures formed in the housing of the plunger assembly 18 to prevent rotation of the piston 206 as the screw shaft 216 rotates around the piston 206. For example, the piston 206 may include outwardly extending splines or tabs (not shown) that are disposed within longitudinally extending grooves (not shown) formed in the housing of the plunger assembly 18 such that the tabs slide along within the grooves as the piston 206 travels in the bore 200.

As will be discussed below, the plunger assembly 18 is preferably configured to provide pressure to the conduit 34 when the piston 206 is moved in both the forward and rearward directions. The plunger assembly 18 includes a seal 230 mounted on the enlarged end portion 208 of the piston 206. The seal 230 slidably engages with the inner cylindrical surface of the first portion 202 of the bore 200 as the piston 206 moves within the bore 200. A seal 234 and a seal 236 are mounted in grooves formed in the second portion 204 of the bore 200. The seals 234 and 236 slidably engage with the outer cylindrical surface of the central portion 210 of the piston 206. A first pressure chamber 240 is generally defined by the first portion 202 of the bore 200, the enlarged end portion 208 of the piston 206, and the seal 230. An annular shaped second pressure chamber 242, located generally behind the enlarged end portion 208 of the piston 206, is generally defined by the first and second portions 202 and 204 of the bore 200, the seals 230 and 234, and the central portion 210 of the piston 206. The seals 230, 234, and 236 can have any suitable seal structure.

Although the plunger assembly 18 may be configured to any suitable size and arrangement, in one embodiment, the effective hydraulic area of the first pressure chamber 240 is greater than the effective hydraulic area of the annular shaped second pressure chamber 242. The first pressure chamber 240 generally has an effective hydraulic area corresponding to the diameter of the central portion 210 of the piston 206 (the inner diameter of the seal 234) since fluid is diverted through the conduits 254, 34, and 243 as the piston 206 is advanced in the forward direction. The second pressure chamber 242 generally has an effective hydraulic area corresponding to the diameter of the first portion 202 of the bore 200 minus the diameter of the central portion 210 of the piston 206. This configuration provides that on the back stroke in which the piston 206 is moving rearwardly, less torque (or power) is required by the motor 214 to maintain the same pressure as in its forward stroke. Besides using less power, the motor 214 may also generate less heat during the rearward stroke of piston 206. Under circumstances when high brake pressure is desired, the plunger assembly 34 could be operated from a forward stroke to a rearward stroke. So while a forward stroke is used in most brake applications, a rearward pressure stroke can be utilized. Also, under circumstances in which the driver presses on the pedal 90 for long durations, the brake system 10 could be operated to maintain brake pressure (instead of continuously energizing the plunger assembly 34) by controlling the first and second plunger valves 250 and 252 (as will be discussed below) to closed positions and then turn off the motor or the plunger assembly 34.

The plunger assembly 18 preferably includes a sensor, schematically shown as 218, for detecting the position of the piston 206 within the bore 200. The sensor 218 is in communication with the ECU 22. In one embodiment, the sensor 218 may detect the position of the piston 206, or alternatively, metallic or magnetic elements embedded with the piston 206. In an alternate embodiment, the sensor 218 may detect the rotational position of the motor 214 and/or other portions of the ball screw mechanism 212 which is indicative of the position of the piston 206. The sensor 218 can be located at any desired position.

The piston 206 of the plunger assembly 18 includes a passageway 244 formed therein. The passageway 244 defines a first port 246 extending through the outer cylindrical wall of the piston 206 and is in fluid communication with the secondary chamber 242. The passageway 244 also defines a second port 248 extending through the outer cylindrical wall of the piston 206 and is in fluid communication with a portion of the bore 200 located between the seals 234 and 236. The second port 248 is in fluid communication with a conduit 249 which is in fluid communication with the reservoir 20 (T3). When in the rest position, as shown in FIG. 2, the pressure chambers 240 and 242 are in fluid communication with the reservoir 20 via the conduit 249. This helps in ensuring a proper release of pressure at the output of the plunger assembly 18 and within the pressure chambers 240 and 242 themselves. After an initial forward movement of the piston 206 from its rest position, the port 248 will move past the lip seal 234, thereby closing off fluid communication of the pressure chambers 240 and 242 from the reservoir 20, thereby permitting the pressure chambers 240 and 242 to build up pressure as the piston 206 moves further.

Referring back to FIG. 1, the brake system 10 further includes a first plunger valve 250, and a second plunger valve 252. The first plunger valve 250 is preferably a solenoid actuated normally closed valve. Thus, in the non-energized state, the first plunger valve 250 is in a closed position, as shown in FIG. 1. The second plunger valve 252 is preferably a solenoid actuated normally open valve. Thus, in the non-energized state, the second plunger valve 252 is in an open position, as shown in FIG. 1. A check valve may be arranged within the second plunger valve 252 so that when the second plunger valve 252 is in its closed position, fluid may still flow through the second plunger valve 252 in the direction from a first output conduit 254 (from the first pressure chamber 240 of the plunger assembly 18) to the conduit 34 leading to the isolation valves 30 and 32. Note that during a rearward stroke of the piston 206 of the plunger assembly 18, pressure may be generated in the second pressure chamber 242 for output into the conduit 34.

Generally, the first and second plunger valves 250 and 252 are controlled to permit fluid flow at the outputs of the plunger assembly 18 and to permit venting to the reservoir 20 (T3) through the plunger assembly 18 when so desired. For example, the first plunger valve 250 may be energized to its open position during a normal braking event so that both of the first and second plunger valves 250 and 252 are open (which may reduce noise during operation). Preferably, the first plunger valve 250 is almost always energized during an ignition cycle when the engine is running. Of course, the first plunger valve 250 may be purposely moved to its closed position such as during a pressure generating rearward stroke of the plunger assembly 18. The first and second plunger valves 250 and 252 are preferably in their open positions when the piston 206 of the plunger assembly 18 is operated in its forward stroke to maximize flow. When the driver releases the brake pedal 70, the first and second plunger valves 250 and 252 preferably remain in their open positions. Note that fluid can flow through the check valve within the closed second plunger valve 252, as well as through a check valve 258 from the reservoir 20 depending on the travel direction of the piston 206 of the plunger assembly 18.

It may be desirable to configure the first plunger valve 250 with a relatively large orifice therethrough when in its open position. A relatively large orifice of the first plunger assembly 250 helps to provide an easy flow path therethrough. The second plunger valve 252 may be provided with a much smaller orifice in its open position as compared to the first plunger valve 250. One reason for this is to help prevent the piston 206 of the plunger assembly 18 from rapidly being back driven upon a failed event due to the rushing of fluid through the first output conduit 254 into the first pressure chamber 240 of the plunger assembly 18, thereby preventing damage to the plunger assembly 18. As fluid is restricted in its flow through the relatively small orifice, dissipation will occur as some of the energy is transferred into heat. Thus, the orifice should be of a sufficiently small size so as to help prevent a sudden catastrophic back drive of the piston 206 of the plunger assembly 18 upon failure of the brake system 10, such as for example, when power is lost to the motor 214 and the pressure within the conduit 34 is relatively high. As shown in FIG. 2, the plunger assembly 18 may include an optional spring member, such as a spring washer 277, to assist in cushioning such a rapid rearward back drive of the piston 206. The spring washer 277 may also assist in cushioning the piston 206 moving at any such speed as it approaches a rest position near its most retracted position within the bore 200. Schematically shown in FIG. 2, the spring washer 277 is located between the enlarged end portion 208 and a shoulder 279 formed in the bore 200 between the first and second portions 202 and 204. The spring washer 277 can have any suitable configuration which deflects or compresses upon contact with the piston 206 as the piston 206 moves rearwardly. For example, the spring washer 277 may be in the form of a metal conical spring washer. Alternatively, the spring washer 277 may be in the form of a wave spring. Although the spring washer 277 is shown mounted within the bore 200 of the plunger assembly 18, the spring washer 277 may alternatively be mounted on the piston 206 such that the spring washer 277 moves with the piston 206. In this configuration, the spring washer 277 would engage with the shoulder 279 and compress upon sufficient rightward movement of the piston 206.

The first and second plunger valves 250 and 252 provide for an open parallel path between the pressure chambers 240 and 242 of the plunger assembly 18 during a normal braking operation. Although a single open path may be sufficient, the advantage of having both the first and second plunger valves 250 and 252 is that the first plunger valve 250 may provide for an easy flow path through the relatively large orifice thereof, while the second plunger valve 252 may provide for a restricted orifice path during certain failed conditions (when the first plunger valve 250 is de-energized to its closed position.

During a typical or normal braking operation, the brake pedal 70 is depressed by the driver of the vehicle. In a preferred embodiment of the brake system 10, the master cylinder 14 includes one or more travel sensors 270 (for redundancy) for producing signals transmitted to the ECU 22 that are indicative of the length of travel of the input piston 82 of the master cylinder 14.

During normal braking operations, the plunger assembly 18 is operated to provide pressure to the conduit 34 for actuation of the wheel brakes 12a, 12b, 12c, and 12d. Under certain driving conditions, the ECU 22 communicates with a powertrain control module (not shown) and other additional braking controllers of the vehicle to provide coordinated braking during advanced braking control schemes (e.g., anti-lock braking (AB), traction control (TC), vehicle stability control (VSC), and regenerative brake blending). During a normal brake apply, the flow of pressurized fluid from the master cylinder 14, generated by depression of the brake pedal 70, is diverted into the pedal simulator 16. The simulator valve 116 is actuated to divert fluid through the simulator valve 116 from the input chamber 92. Note that the simulator valve 116 is shown in its energized state in FIG. 1. Thus, the simulator valve 116 is a normally closed solenoid valve. Also note that fluid flow from the input chamber 92 to the reservoir 20 is closed off once the passageway 106 in the input piston 82 moves past the seal 104.

During the duration of a normal braking event, the simulator valve 116 remains open, preferably. Also during the normal braking operation, the isolation valves 30 and 32 are energized to secondary positions to prevent the flow of fluid from the conduits 36 and 38 through the isolation valves 30 and 32, respectively. Preferably, the isolation valves 30 and 32 are energized throughout the duration of an ignition cycle such as when the engine is running instead of being energized on and off to help minimize noise. Note that the primary and secondary pistons 84 and 86 are not in fluid communication with the reservoir 20 due to their passageways 136 and 144, respectively, being positioned past the lip seals 132 and 140, respectively. Prevention of fluid flow through the isolation valves 30 and 32 hydraulically locks the primary and secondary chambers 94 and 96 of the master cylinder 14 preventing further movement of the primary and secondary pistons 84 and 86.

It is generally desirable to maintain the isolation valves 30 and 32 energized during the normal braking mode to ensure venting of fluid to the reservoir 20 through the plunger assembly 18 such as during a release of the brake pedal 70 by the driver. As best shown in FIG. 1, the passageway 244 formed in the piston 206 of the plunger assembly 18 permits this ventilation.

During normal braking operations, while the pedal simulator 16 is being actuated by depression of the brake pedal 70, the plunger assembly 18 can be actuated by the ECU 22 to provide actuation of the wheel brakes 12a, 12b, 12c, and 12d. The plunger assembly 18 is operated to provide desired pressure levels to the wheel brakes 12a, 12b, 12c, and 12d compared to the pressure generated by the master cylinder 14 by the driver depressing the brake pedal 70. The electronic control unit 22 actuates the motor 214 to rotate the screw shaft 216 in the first rotational direction. Rotation of the screw shaft 216 in the first rotational direction causes the piston 206 to advance in the forward direction (leftward as viewing FIGS. 1 and 2). Movement of the piston 206 causes a pressure increase in the first pressure chamber 240 and fluid to flow out of the first pressure chamber 240 and into the conduit 254. Fluid can flow into the conduit 34 via the open first and second plunger valves 250 and 252. Note that fluid is permitted to flow into the second pressure chamber 242 via a conduit 243 as the piston 206 advances in the forward direction. Pressurized fluid from the conduit 34 is directed into the conduits 40 and 42 through the isolation valves 30 and 32. The pressurized fluid from the conduits 40 and 42 can be directed to the wheel brakes 12a, 12b, 12c, and 12d through open apply valves 50, 54, 58, and 62 while the dump valves 52, 56, 60, and 64 remain closed. When the driver lifts off or releases the brake pedal 70, the ECU 22 can operate the motor 214 to rotate the screw shaft 216 in the second rotational direction causing the piston 206 to retract withdrawing the fluid from the wheel brakes 12a, 12b, 12c, and 12d. The speed and distance of the retraction of the piston 206 is based on the demands of the driver releasing the brake pedal 70 as sensed by the sensor 218. Of course, if the driver rapidly releases the brake pedal 90, the plunger assembly 14 may be operated to avoid such an instant drop in pressure. Under certain conditions, such as in a non-boosted slip control event, the pressurized fluid from the wheel brakes 12a, 12b, 12c, and 12d may assist in back-driving the ball screw mechanism 212 moving the piston 206 back towards its rest position. Note that when the driver releases the brake pedal 90, the first and second plunger valves 250 and 252 preferably remain in their open positions during a non-slip control event.

In some situations, the piston 206 of the plunger assembly 18 may reach its full stroke length within the bore 200 of the housing and additional boosted pressure is still desired to be delivered to the wheel brakes 12a, 12b, 12c, and 12d. The plunger assembly 18 is a dual acting plunger assembly such that it is configured to also provide boosted pressure to the conduit 34 when the piston 206 is stroked rearwardly (rightward) or in a reverse direction. This has the advantage over a conventional plunger assembly that first requires its piston to be brought back to its rest or retracted position before it can again advance the piston to create pressure within a single pressure chamber. If the piston 206 has reached its full stroke, for example, and additional boosted pressure is still desired, the second plunger valve 252 is energized to its closed check valve position. The first plunger valve 250 is de-energized to its closed position. The electronic control unit 22 actuates the motor 214 in a second rotational direction opposite the first rotational direction to rotate the screw shaft 216 in the second rotational direction. Rotation of the screw shaft 216 in the second rotational direction causes the piston 206 to retract or move in the rearward direction (rightward as viewing FIGS. 1 and 2). Movement of the piston 206 causes a pressure increase in the second pressure chamber 242 and fluid to flow out of the second pressure chamber 242 and into the conduit 243 and the conduit 34. Pressurized fluid from the conduit 34 is directed into the conduits 40 and 42 through the isolation valves 30 and 32. The pressurized fluid from the conduits 40 and 42 can be directed to the wheel brakes 12a, 12b, 12c, and 12d through the opened apply valves 50, 54, 58, and 62 while dump valves 52, 56, 60, and 64 remain closed. In a similar manner as during a forward stroke of the piston 206, the ECU 22 can also selectively actuate the apply valves 50, 54, 58, and 62 and the dump valves 52, 56, 60, and 64 to provide a desired pressure level to the wheel brakes 12a, 12b, 12c, and 12d, respectively. When the driver lifts off or releases the brake pedal 70 during a pressurized rearward stroke of the plunger assembly 18, the first and second plunger valves 250 and 252 are preferably operated to their open positions, although having only one of the valves 250 and 252 open would generally still be sufficient. Note that when transitioning out of a slip control event, the ideal situation would be to have the position of the piston 206 and the displaced volume within the plunger assembly 18 correlate exactly with the given pressures and fluid volumes within the wheel brakes 12a, 12b, 12c, and 12d. However, when the correlation is not exact, fluid can be drawn from the reservoir 20 via the check valve 258 into the chamber 240 of the plunger assembly 18.

During a braking event, the ECU 22 can selectively actuate the apply valves 50, 54, 58, and 62 and the dump valves 52, 56, 60, and 64 to provide a desired pressure level to the wheel brakes, respectively. The ECU 22 can also control the brake system 10 during ABS, DRP, TC, VSC, regenerative braking, and autonomous braking events by general operation of the plunger assembly 18 in conjunction with the apply valves and the dump valves. Even if the driver of the vehicle is not depressing the brake pedal 70, the ECU 22 can operate the plunger assembly 18 to provide a source of pressurized fluid directed to the wheel brakes, such as during an autonomous vehicle braking event.

In the event of a loss of electrical power to portions of the brake system 10, the brake system 10 provides for manual push through or manual apply such that the master cylinder 14 can supply relatively high pressure fluid to the conduits 36 and 38. During an electrical failure, the motor 214 of the plunger assembly 18 might cease to operate, thereby failing to produce pressurized hydraulic brake fluid from the plunger assembly 18. The isolation valves 30 and 32 will shuttle (or remain) in their positions to permit fluid flow from the conduits 36 and 38 to the wheel brakes 12a, 12b, 12c, and 12d. The simulator valve 116 is shuttled to its closed position to prevent fluid from flowing out of the input chamber 92 to the pedal simulator 16. During the manual push-through apply, the input piston 82, the primary piston 84, and the secondary piston 86 will advance leftwardly such that the passageways 106, 136, 144 will move past the seals 102, 132, and 140, respectively, to prevent fluid flow from their respective fluid chambers 92, 94, and 96 to the reservoir 20, thereby pressurizing the chambers 92, 94, and 96. Fluid flows from the chambers 94 and 96 into the conduits 38 and 36, respectively, to actuate the wheel brakes 12a, 12b, 12c, and 12d.

Figure 3:
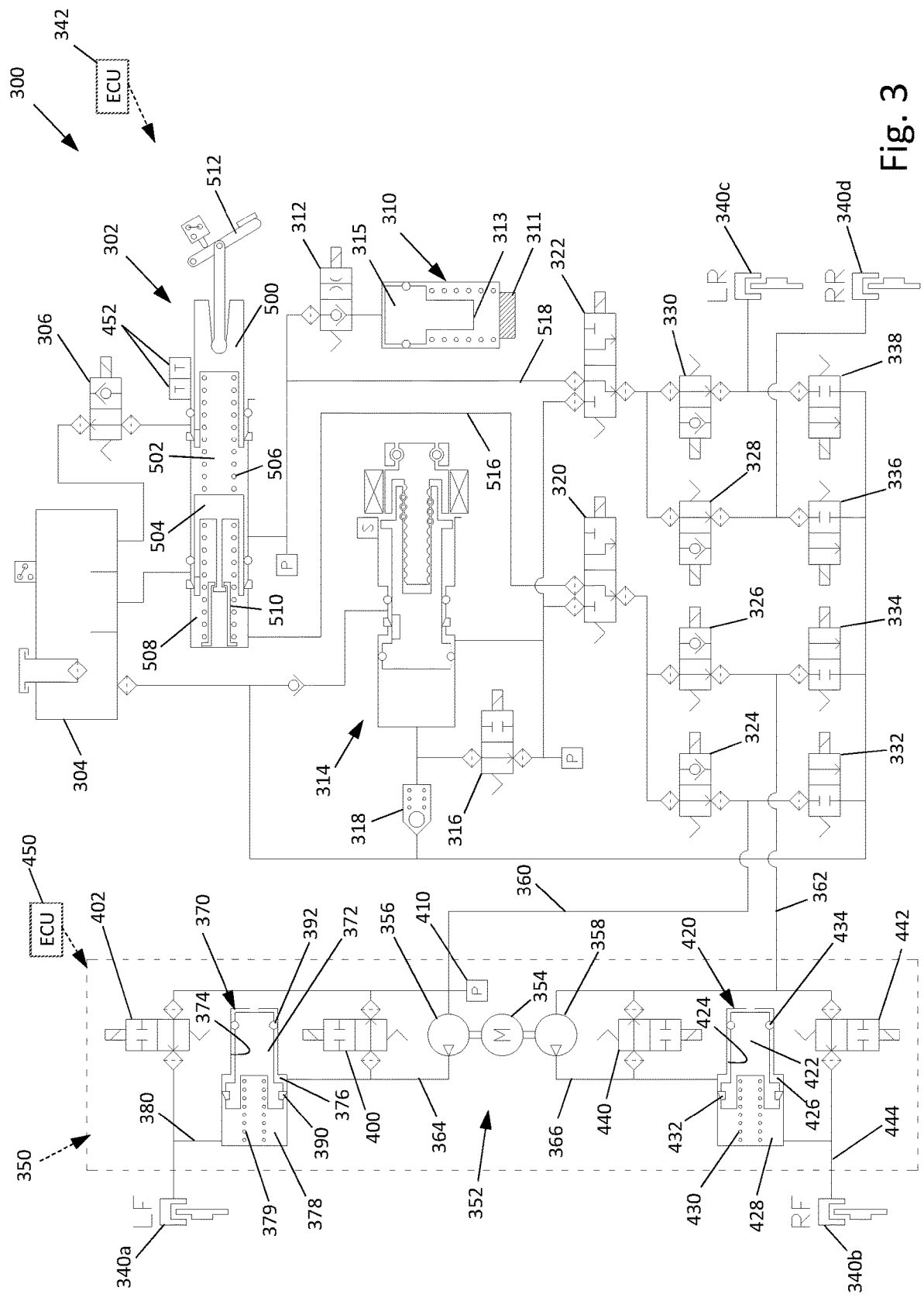
FIG. 3 is a schematic illustration of a second embodiment of a brake system.

There is illustrated in FIG. 3, an alternate embodiment of a brake system, indicated generally at 300. The brake system 300 is similar in structure and function in many ways as the brake system 10 described above. As such, similarities between the brake systems 10 and 300 may not be discussed in duplication herein. The brake system 300 includes a master cylinder, indicated generally at 302, a fluid reservoir 304 and a simulator test valve 306. The brake system 300 further includes a pedal simulator 310, a simulator valve 312, and a plunger assembly, indicated generally at 314. Similar to plunger assembly 18 of the brake system 10 discussed above, the plunger assembly 314 functions as a source of pressurized fluid to the brake system 300 during a normal braking mode. The plunger assembly 314 can have a similar structure as the plunger assembly 18 and function in a similar manner as the plunger assembly 18 as discussed above with respect to the brake system 10.

The pedal simulator 310 may have any suitable structure such as the structure of the pedal simulator 16 of the brake system 10. Alternatively, the pedal simulator 310 may have a structure such as shown in FIG. 3 further including an elastomeric pad 311 which may engage and end 313 of a piston 315 slidably disposed within a housing of the pedal simulator 310. The engagement of the end 313 against the pad 311 provides for a different "pedal feel" for the driver of the vehicle via a force feedback from the brake pedal 512.

One of the differences between the brake systems 300 and 10 is that the brake system 300 includes a single plunger valve 316 at an outlet of the plunger assembly 314 instead of a pair of valves 250 and 252 in a parallel arrangement as in the brake system 10. A check valve 318 is disposed between the outlet of the plunger assembly 314 and the reservoir 304 in a similar manner as the check valve 258 of the brake system 10.

The brake system 300 further includes first and second isolation valves 320 and 322, apply valves 324, 326, 328, 330, and dump valves 332, 334, 336, 338 which operate in a similar manner as the valves shown and described in the brake system 10 above. A wheel brake 340a is preferably associated with the left front wheel of the vehicle in which the brake system 300 is installed. A wheel brake 340*b* is preferably associated with the right front wheel. A wheel brake 340*c* is preferably associated with the left rear wheel. A wheel brake 340*d* is preferably associated with the right rear wheel.

Similar to the brake system 10, the brake system 300 includes a main electronic control unit (ECU) 342. The main ECU 342 may include microprocessors. The main ECU 342 receives various signals, processes signals, and controls the operation of various electrical components of the brake system 300 in response to the received signals. The main ECU 342 can be connected to various sensors such as pressure sensors, travel sensors, switches, wheel speed sensors, and steering angle sensors. The main ECU 342 may also be connected to an external module (not shown) for receiving information related to yaw rate, lateral acceleration, longitudinal acceleration of the vehicle such as for controlling the brake system 300 during vehicle stability operation. Additionally, the main ECU 342 may be connected to the instrument cluster for collecting and supplying information related to warning indicators such as an ABS warning light, a brake fluid level warning light, and a traction control/vehicle stability control indicator light.

One of the major differences between the brake systems 10 and 300 is that the brake system 300 includes a secondary unit, indicated generally at 350, which may function as a second source of pressurized fluid for the front wheel brakes 340*a* and 340*b*, such as under certain failed conditions of the brake system 300 such as a manual push-through mode or event, as will be explained below. The secondary unit 350 may be housed in a different block or unit remotely located from the remainder of the brake system 300, or may be housed integrally therewith. The secondary unit 350 includes a pump assembly, indicated generally at 352. The pump assembly 352 can be any suitable pump assembly for providing a source of fluid. In the embodiment shown, a single motor 354 drives first and second pumps 356 and 358. The first pump 356 is in fluid communication with an inlet conduit 360 in fluid communication between the apply valve 324 and the dump valve 332. The second pump 358 is in fluid communication with an inlet conduit 362 in fluid communication between the apply valve 326 and the dump valve 334. When operated, the first pump 356 supplies pressurized fluid to an output conduit 364, while the second pump 358 provides pressurized fluid to an output conduit 366.

Figure 4:
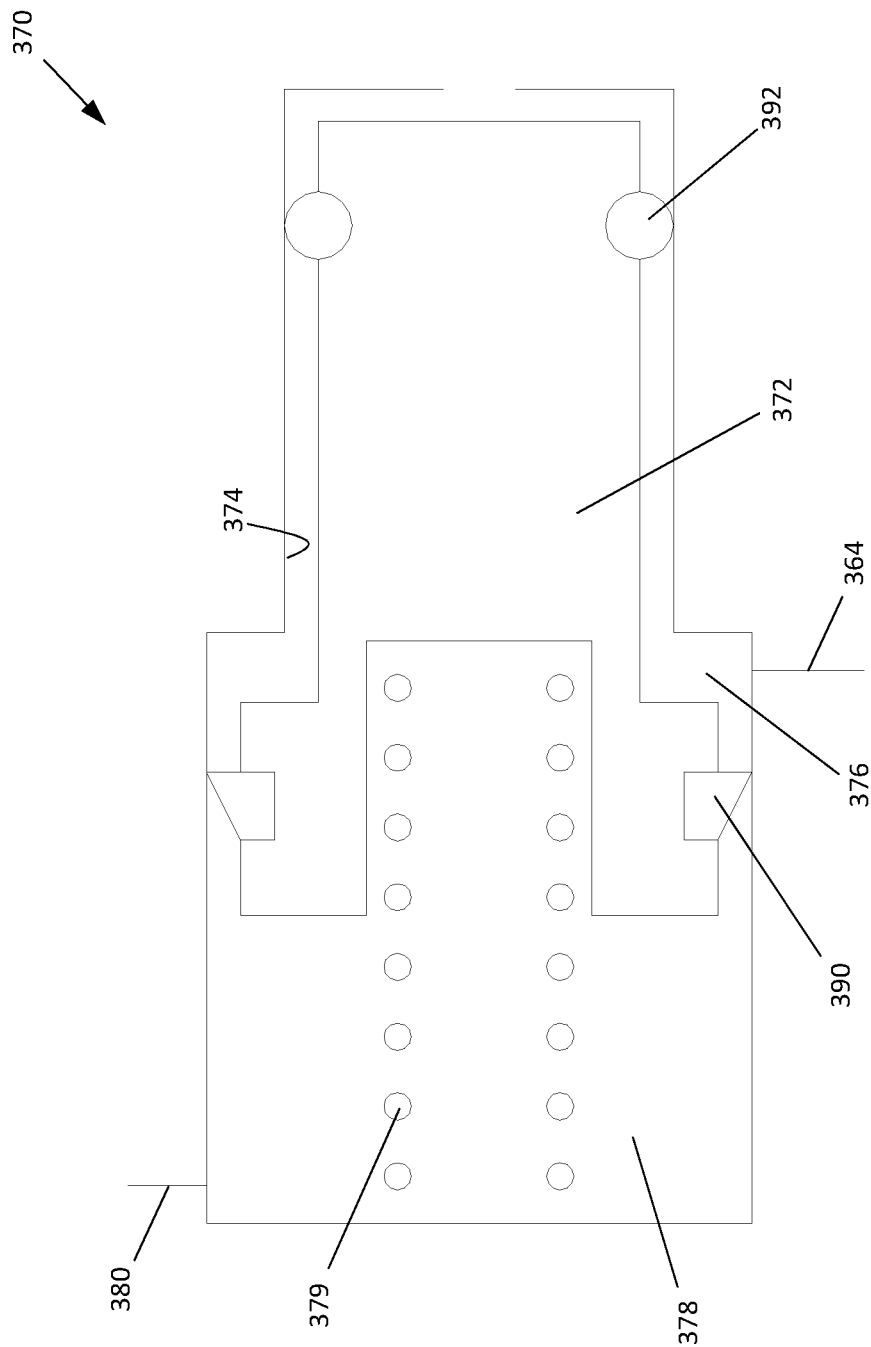
FIG. 4 is an enlarged schematic illustration of the intensifier of FIG. 3.

The secondary unit 350 further includes a first volume intensifier, indicated generally at 370, in fluid communication with the output conduit 364. The intensifier 370 is also shown in an enlarged schematic format in FIG. 4 for clarity of the structure of the intensifier 370. The intensifier 370 may be any suitable volume intensifier which increases the volume of fluid exiting the intensifier compared to the volume of fluid entering the intensifier. In the embodiment shown, the intensifier 370 includes a stepped piston 372 disposed in a multi-stepped bore 374 of a housing defining an inlet chamber 376 and an outlet chamber 378. A spring 379 biases the piston 372 within the housing. The effective hydraulic areas acting on the chambers 376 and 378 are such that a greater amount of fluid will be displaced out through a conduit 380 (leading to the wheel brake 340*a*), which is in fluid communication with the outlet chamber 378, than entering the inlet chamber 376 via the conduit 364 from the first pump 356. The intensifier 370 may be designed with any suitable ratio of volume entering versus exiting the intensifier 370. For example, the intensifier 370 could be configured such that for every 1 cm³ of fluid entering the inlet chamber 376, 2 cm³ of fluid exits the outlet chamber 378.

The intensifier 370 includes a first seal 390 engaged with a larger diameter portion of the piston 372. The intensifier 370 includes a second seal 392 engaged with a smaller diameter portion of the piston 372. In a preferred embodiment, the first seal 390 is the form of a lip seal such that fluid may flow past the first seal 390 in the direction from the outlet chamber 378 to the inlet chamber 376. Under certain conditions, such as when the pressure within the outlet chamber 378 is greater than the pressure within the inlet chamber 376, fluid may flow past the first seal 390. An example of one such condition is during a return stroke of the piston 372.

A normally open solenoid actuated valve 400 is disposed between the output conduit 364 and the inlet conduit 360. A normally open solenoid actuated valve 402 is disposed between the conduit 380 and the inlet conduit 360. In a preferred embodiment, the valve 402 has a relatively large orifice such that under normal braking operations in which the secondary unit 350 is not engaged or operated, most (or all) of the fluid flowing from the conduit 360 will pass through the valve 402 to the wheel brake 340*a*. For example, it is preferable to have an orifice sized for the valve 402 that is at least as large as the orifice of the apply valve 324 within its circuit. Of course, under certain conditions some fluid could be pushed through the pump assembly 352 and/or the valve 400.

Preferably, a pressure sensor 410 senses the pressure within the conduit 360 (or 362) such that the driver's demands can be determined under certain failed conditions (such as manual push through event) for proper operation of the secondary unit 350.

The secondary unit 350 includes various components associated with the wheel brake 340*b* in a similar manner with respect to the wheel brake 340*a* as described. These components are similar and structure and function and thus a duplicate description will not necessarily be recited herein. The components include a second volume intensifier, indicated generally at 420, having a stepped piston 422 disposed in a bore 424, defining an inlet chamber 426 and an outlet chamber 428, a spring 430, a first seal 432, a second seal 434. Furthermore, the secondary unit 350 includes a normally open solenoid actuated valve 440 disposed between the output conduit 366 and the inlet conduit 362, and a normally open solenoid actuated valve 442 disposed between a conduit 444 and the inlet conduit 362.

The brake system 300 preferably includes a secondary ECU, indicated generally at 450. The secondary ECU 450 may include microprocessors and function in a similar manner as the ECUs 22 and 342 as described above. The secondary ECU 450 generally controls the operation of the components within the secondary unit 350. Thus, the secondary ECU 450 receives various signals, processes signals, and controls the operation of various electrical components of the secondary unit 350 in response to the received signals. The secondary ECU 450 preferably is connected to at least one of two travel sensors 452 of the master cylinder 302. The travel sensors 452 operate in a similar manner as the travel sensors 270 with respect to the operation of the brake system 10. The secondary ECU 450 is preferably separate from and located remotely from the main ECU 342.

The main ECU 342 and the secondary ECU 450 may both be connected to a vehicle CAN bus (Controller Area Network bus) for receiving various signals and controls. Both the main ECU 342 and the secondary ECU 450 may send out signals over the CAN bus indicating that they are operating properly. These signals may be received by the other of the ECU 342 and 450. For example, once the secondary ECU 450 does not receive the signal from the main ECU 342 over the CAN bus of proper operation of the main ECU 342, the secondary 450 may begin operating the secondary unit 350, as will be described below.

The secondary ECU 450 may even function as a fail-safe back up in case the main ECU 342 fails. It should be understood that the brake system 300 could be configured such that the main ECU 342 also controls the secondary unit 350. Alternatively, the secondary ECU 450 may be eliminated such that the main ECU 342 controls the entire brake system 300 including the secondary unit 350.

Figure 5:
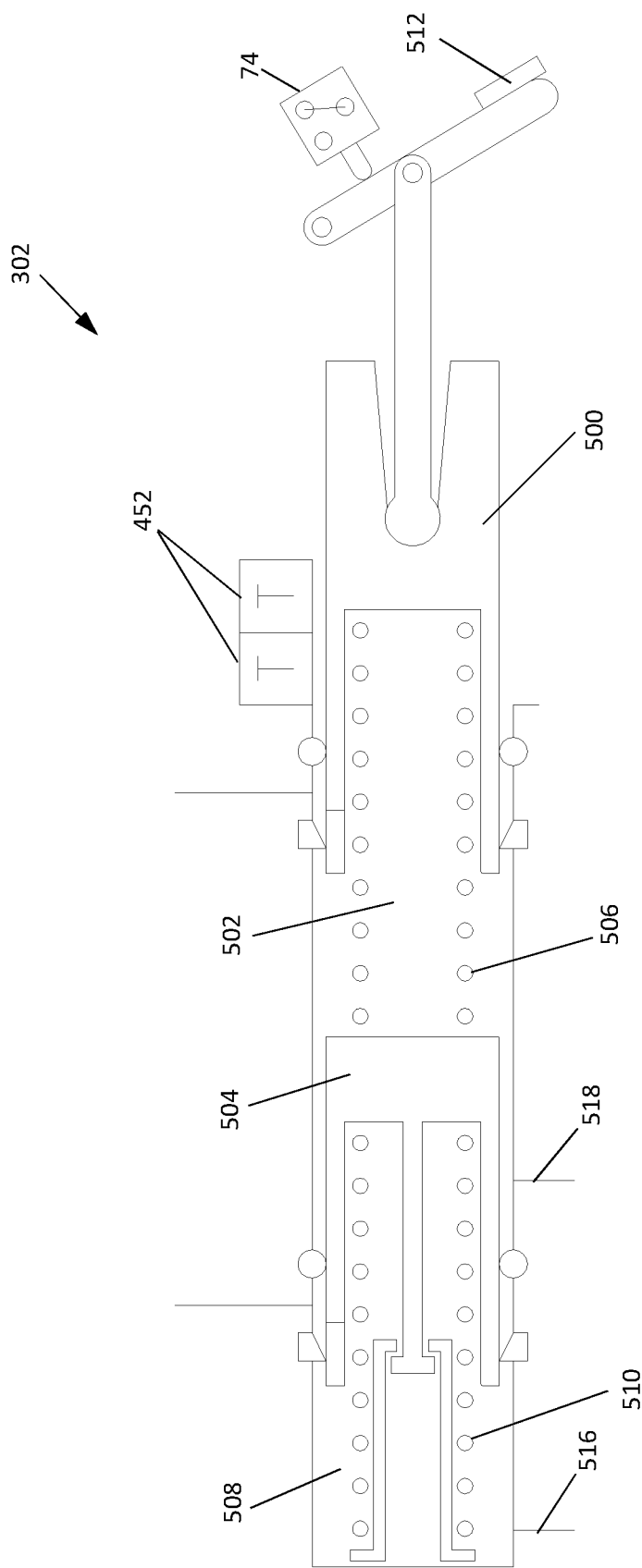
FIG. 5 is an enlarged schematic illustration of the master cylinder of FIG. 3.

Another difference between the brake systems 10 and 300 is that the master cylinder 302 of the brake system 300 may have a simpler design than the master cylinder 14. The master cylinder 302 is also shown in an enlarged schematic format in FIG. 5 for clarity of the structure of the master cylinder 302. The master cylinder 302 may be more comparable to a conventional master cylinder. The master cylinder 302 includes a primary piston 500 for pressurizing a primary chamber 502. A secondary piston 504 is biased from the primary piston 500 by a spring 506. Movement of the secondary piston 504 pressurizes a secondary chamber 508. A caged spring assembly 510 is located within the secondary chamber 508.

Under a normal braking mode, the driver depresses a brake pedal 512 which causes movement of the primary and secondary pistons 500 and 504 until fluid communication is closed off from the primary and secondary chambers 502 and 508 to the reservoir 304 (in a similar manner as described above with respect to the master cylinder 14). Fluid is then diverted from the primary chamber 502 into the pedal simulator 310 through the energized simulator valve 312. The isolation valves 320 and 322 are preferably energized and controlled by the main ECU 342 to prevent the flow of fluid in a direction from the primary and secondary chambers 502 and 508 to the wheel brakes. The main ECU 342 then controls the plunger assembly 314 to provide the desired fluid pressure to the wheel brakes 340*a*, 340*b*, 340*c*, and 340*d*. Note that for the front wheel circuit, fluid flows from the conduits 360 and 362, through the normally open valves 402 and 442, respectively, to the front wheel brakes 340*a* and 340*b*. It is also noted that the volume of fluid within the secondary chamber 508 of the master cylinder 302 generally retains its maximum volume due to the closing off position of the energized isolation valve 320 at a conduit 516 in fluid communication with the secondary chamber 508.

The brake system 300 is ideally suited for vehicles, such as trucks, that have wheel brakes requiring a relatively high volume of fluid for full operation thereof. Thus, these vehicles may demand a brake system capable of providing a relatively large volume of fluid to the wheel brakes (especially front wheel brakes) compared to brake systems designed for smaller passenger vehicles. This may be especially true in a failed condition when the brake system 300 is undergoing a manual push-through mode.

During a manual push through mode, the brake system 300 can provide a relatively large volume of fluid for the front wheel brakes 240*a* and 240*b* via the secondary unit 350. The pump assembly 352, in cooperation with the intensifiers 370 and 420, can supply such high volume fluid demands. For example, if an electrical failure occurred in the brake system 300, the secondary unit 350 may be operated to provide an over-boost function to the front wheel brakes 340*a* and 340*b*. During this failure, the plunger assembly 314 and/or the main ECU 342 may be inoperable. The secondary unit 350 may be located remotely and/or electrically disconnected therefrom for such a reason. Thus, it is desirable to include the separate secondary ECU 450 for controlling the secondary unit 350 which would be separate from the main ECU 342 controlling the brake system 300.

The operation of the secondary unit 350 will now be explained relative to the brake system 300 undergoing a manual push through mode or event. If a failed condition occurred prior to the driver applying the brakes (pushing on the brake pedal 512), fluid from the primary and secondary chambers 502 and 508 of the master cylinder 302 will be diverted through the deenergized isolation valves 320 and 322 when the driver pushes on the brake pedal 512. Actuation of the brake pedal 512 by the driver causes the primary piston 500 to move leftward, as viewing FIG. 3, thereby building pressure within the primary chamber 502 and causing fluid to flow through a conduit 518 to the second isolation valve 322. A pressure build up in the primary chamber 502 causes movement of the secondary piston 504 in the leftward direction, as viewing FIG. 3, thereby building pressure in the secondary chamber 508 and causing fluid to flow through conduit 516 towards the first isolation valve 320.

The rear wheel brakes 340*c* and 340*d* will receive pressurized fluid from the primary chamber 502 of the master cylinder 302. Note that fluid pressure at the rear wheel brakes 340*c* and 340*d* can be increased due to the floating piston design of the master cylinder 314 generally independently from the operation of the front wheel brakes 340*a* and 340*b*.

With respect to the front wheel brakes 340*a* and 340*b*, the secondary unit 350 may be operated by the secondary ECU 450 (or the main ECU 342) to engage the pump assembly 352 during a manual push-through mode. Fluid is diverted from the secondary chamber 508 of the master cylinder 314 to the inlet of the pumps 356 and 358 via the conduits 360 and 362. Preferably, the valves 400, 402, 440, and 442 are energized to their closed positions by the secondary ECU 450. However, the valves 402 and 442 could be controlled to their open positions before the motor 354 of the pumps 356 and 358 is turned on or at initial power up. This may be particular useful during a spike apply when the driver of the vehicle rapidly and forcefully engages the brake pedal 512, thereby providing sufficient pressure to the front wheel brakes 340*a* and 340*b* via the conduits 364 and 366 before the pumps 356 and 358 have had a chance to ramp up. Operation of the pumps 356 and 358 causes a pressure increase in the conduits 364 and 366 which causes a pressure increase in the inlet chamber 376 and 426 of the intensifiers 370 and 420, respectively. An increase in pressure of the inlet chambers 376 and 426 causes the pistons 372 and 422 to move leftward, as viewing FIG. 3, thereby causing fluid to fluid to flow out from the outlet chambers 378 and 428 to the conduits 380 and 444, respectively, to the wheel brakes 340*a* and 340*b*.

Although the intensifiers 370 and 420 provide a greater amount of fluid to the respective front wheel brakes 340*a* and 340*b*, the output pressure is dropped. Although the driver would normally have to push harder on the brake pedal 512 to compensate for the pressure loss through the intensifiers 370 and 420, the pump assembly 352 in cooperation with the valves 400 and 440 can be controlled to provide additional fluid pressure. If the pump assembly 352 is providing too much pressure to the system, the valves 400 and/or 440 can be operated to their open positions to vent pressure build up in the conduits 364 and 366. Note that the pressure sensor 410 may be used to determine the driver's intent especially if the other sensors of the brake system 300 are inoperable due to the failed condition. The pump pressure is a function of the displaced brake P-V and the area ratio of the associated intensifier 370 and 420.

Preferably, the valves 402 and 442 remain energized in their closed positions during the event. As the driver releases the brake pedal 512 to end the braking event, fluid is diverted from the wheel brakes 340a and 340b back into the intensifiers 370 and 420. Normally, all of the fluid is released from the front wheel brakes 340a and 34b as the pistons 372 and 422 of the intensifiers 370 and 420, respectively, retract back to their home at rest position. However, in case pressure remains in the front wheel brakes 340a and 340b, fluid can flow through the lip seals 390 and 432 even if the pistons 372 and 422 are fully retracted.

It should be understood that the presence of the intensifiers 370 and 420 are optional for the brake system 300. If the intensifiers 370 and 420 are eliminated, fluid can flow directly from the outlet of the pumps 356 and 358 to the wheel brakes 340a and 340b.

The pump assembly 352 could be designed in a relative simple manner such that the motor 354 runs at a single or full speed providing the maximum output of the pumps 356 and 358. The valves 400 and 440 can then be controlled between closed and open positions to regulate the desired pressure level within the conduits 364 and 366. However, the pump assembly 352 could be designed such that the motor 354 is regulated to provide a range of desired pump pressure outputs.

If a failure occurs during a normal braking event, it is noted that fluid loss may occur with respect to the circuit associated with the rear wheel brakes 340c and 340d since fluid will have been previously sent to the pedal simulator 310. However, almost all of the fluid within the secondary chamber 508 of the master cylinder is available for the circuit associated with the front wheel brakes 340a and 340b. Note that the driver can still generate pressure to the rear wheel brakes 340c and 340d during the manual push through event.

It should be noted that even if the secondary unit 350 also fails during a manual push-though mode, such as by total loss of electrical power supplied to the brake system 300, the master cylinder 302 can still generate brake actuating pressure to the front and rear wheel brakes 340a, 340b, 340c, and 340d. Note that the valves 402 and 442 will shuttle to their normally open positions, thereby permitting fluid flow to the front wheel brakes 340a and 340b.

Although use of the secondary unit 350 was described above with respect to being used during a failure of one or more of the components of the brake system 300, such as during a manual push through event, the secondary unit 350 could be triggered on during a non-failed braking event. Under circumstances when it is desirable to increase the flow volume to the front wheel brakes 340a and/or 340b, the secondary unit 350 could be activated.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A brake system having a wheel brake and being operable under a non-failure normal braking mode and a manual push-through mode, the system comprising:
a master cylinder operable by a brake pedal during a manual push-through mode to provide fluid flow at an output for actuating the wheel brake;
a first source of pressurized fluid disposed in a first module and configured to provide fluid pressure for actuating the wheel brake under a normal braking mode;
a second source of pressurized fluid disposed in a second module and configured to generate pressure for actuating the wheel brake under the manual push-through mode, the second source of pressurized fluid including a pump and a volume intensifier disposed between the pump and the wheel brake;
wherein the volume intensifier is in direct fluid communication with the wheel brake and defines a stepped bore and a stepped piston to enable an enhanced pressure application at the wheel brake under manual push through mode; and
wherein the master cylinder, the second source of pressurized fluid, the volume intensifier and the wheel brake are arranged in series.

2. The brake system of claim 1, wherein the volume intensifier increases a volume of fluid exiting the intensifier to the wheel brake compared to the volume of fluid displaced due to pedal travel under a manual push through mode.

3. The brake system of claim 2, wherein the stepped piston is slidably disposed in the stepped bore.

4. The brake system of claim 3, wherein the brake system includes first and second wheel brakes, and wherein the master cylinder is operable during the manual push-through mode to provide a fluid flow at first and second outputs for actuating the first and second wheel brakes.

5. The brake system of claim 4, wherein the master cylinder includes a housing with first and second pistons slidably disposed in a bore formed in the housing, and wherein the first and second pistons are operable during a manual push-through mode such that the pair of pistons provide fluid flow at first and second outputs for actuating the first and second wheel brakes, respectively.

6. The brake system of claim 5, wherein the second source of pressurized fluid includes a motorized fluid pump such that an inlet of the fluid pump is in fluid communication with the second output of the master cylinder.

7. The brake system of claim 6 further including:
a first electronic control unit for controlling the first source of pressurized fluid; and
a second electronic control unit, separate from the first electronic control unit, for controlling the second source of pressurized fluid.

8. The brake system of claim 7 further including:
a first travel sensor in communication with the first electronic control unit for sensing movement of a piston of the master cylinder; and
a second travel sensor in communication with the second electronic control unit for sensing movement of the piston of the master cylinder.

9. The brake system of claim 8, wherein the second source of pressurized fluid includes a fluid pump driven by an electric motor.

10. The brake system of claim 9, wherein the second source of pressurized fluid further includes a solenoid actuated first valve for selectively diverting fluid from an outlet of the pump to an inlet of the pump.

11. The brake system of claim 10, wherein a solenoid actuated second valve is movable between a first position permitting fluid flow from the master cylinder to the wheel brake, and a second position restricting the flow of fluid from the master cylinder to the wheel brake.

12. The brake system of claim 11, wherein the first source of pressurized fluid is a plunger assembly including a housing defining a bore therein, wherein the plunger assembly includes a piston slidably disposed in the bore of the plunger assembly such that movement of the piston pressurizes a pressure chamber when the piston is moved in a first direction, and wherein the pressure chamber of the plunger assembly is in fluid communication with an output, and wherein the plunger assembly further includes an electrically operated linear actuator for moving the piston within the bore.

13. The brake system of claim 12, wherein when the piston of the plunger assembly is operated in a second direction opposite the first direction, movement of the piston pressurizes a second pressure chamber which is in fluid communication with a second output.

14. The brake system of claim 13, wherein the brake system further includes a pedal simulator in selective fluid communication with the master cylinder, and wherein the brake system further includes a simulator valve selectively permitting fluid communication between the master cylinder and the pedal simulator.

\* \* \* \* \*